(12) United States Patent
Hermansen et al.

(10) Patent No.: US 12,275,492 B1
(45) Date of Patent: Apr. 15, 2025

(54) PEDAL FOR A BICYCLE AND BICYCLE INCLUDING THE SAME

(71) Applicant: Crank Brothers, Inc., Laguna Beach, CA (US)

(72) Inventors: Frank Hermansen, Laguna Beach, CA (US); Carl Winefordner, Laguna Beach, CA (US)

(73) Assignee: Crank Brothers, Inc., Laguna Beach, CA (US)

( * ) Notice: Subject to any disclaimer, the term of this patent is extended or adjusted under 35 U.S.C. 154(b) by 0 days.

(21) Appl. No.: 18/495,187

(22) Filed: Oct. 26, 2023

(51) Int. Cl.
*B62M 3/08* (2006.01)

(52) U.S. Cl.
CPC ..................... *B62M 3/08* (2013.01)

(58) Field of Classification Search
CPC .................. B62M 3/08; B62M 3/10
See application file for complete search history.

(56) References Cited

U.S. PATENT DOCUMENTS

| | | | | |
|---|---|---|---|---|
| 235,551 A * | 12/1880 | Thomas | .................... | B62M 3/08 74/594.4 |
| 505,825 A * | 10/1893 | Peter | ........................ | B62M 3/08 74/594.4 |
| 512,729 A * | 1/1894 | Harry | ........................ | B62M 3/08 74/594.4 |
| 598,525 A * | 2/1898 | Livingston | ............. | B62M 17/00 280/260 |
| 605,536 A * | 6/1898 | Alfred | ....................... | B62M 3/08 74/594.5 |
| 620,266 A * | 2/1899 | Julius | ..................... | B62M 3/086 74/594.6 |
| 1,377,376 A * | 5/1921 | Weston | .................... | B62M 3/08 411/400 |
| 2,512,841 A * | 6/1950 | Streifthau | ................ | B62M 3/08 D12/125 |
| 3,307,425 A * | 3/1967 | Sykes | ....................... | B62M 3/08 74/594.7 |
| 3,457,803 A * | 7/1969 | Sykes | ....................... | B62M 3/08 74/594.7 |
| 4,338,829 A * | 7/1982 | Ozaki | ....................... | B62M 3/08 74/594.4 |
| 2021/0101659 A1* | 4/2021 | Carlson | .................... | B62M 3/16 |

FOREIGN PATENT DOCUMENTS

| | | | | |
|---|---|---|---|---|
| CN | 105000123 A | * | 10/2015 | |
| CN | 107972795 A | * | 5/2018 | ............. B26M 3/08 |
| FR | 565062 A | * | 1/1924 | |
| FR | 999027 A | * | 1/1952 | |
| GB | 173941 A | * | 1/1922 | |
| GB | 619371 A | * | 3/1949 | |

* cited by examiner

*Primary Examiner* — Adam D Rogers
(74) *Attorney, Agent, or Firm* — Tutunjian & Bitetto, P.C.

(57) ABSTRACT

The present invention relates to a pedal for a bicycle having a body including at least two components, and a spindle assembly for the connection of the pedal to a crank arm of a bicycle.

14 Claims, 5 Drawing Sheets

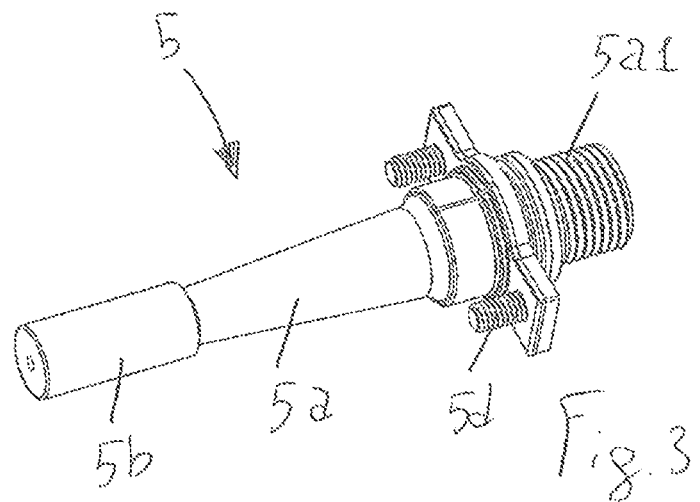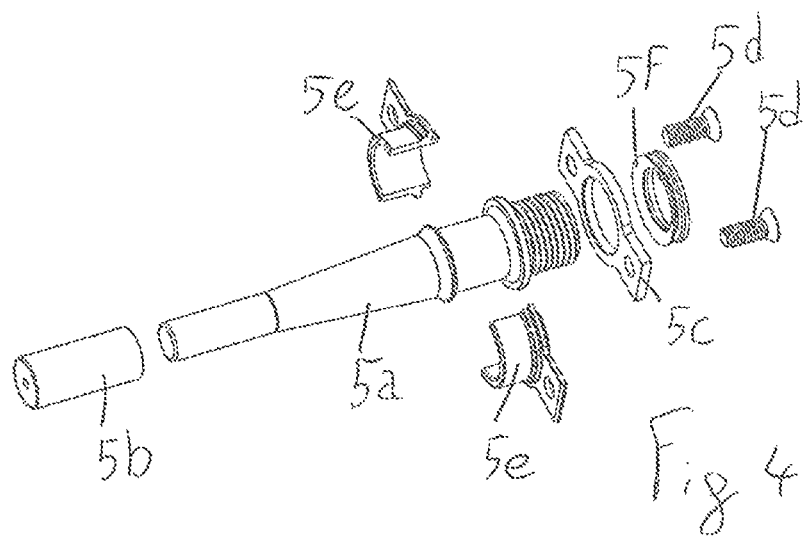

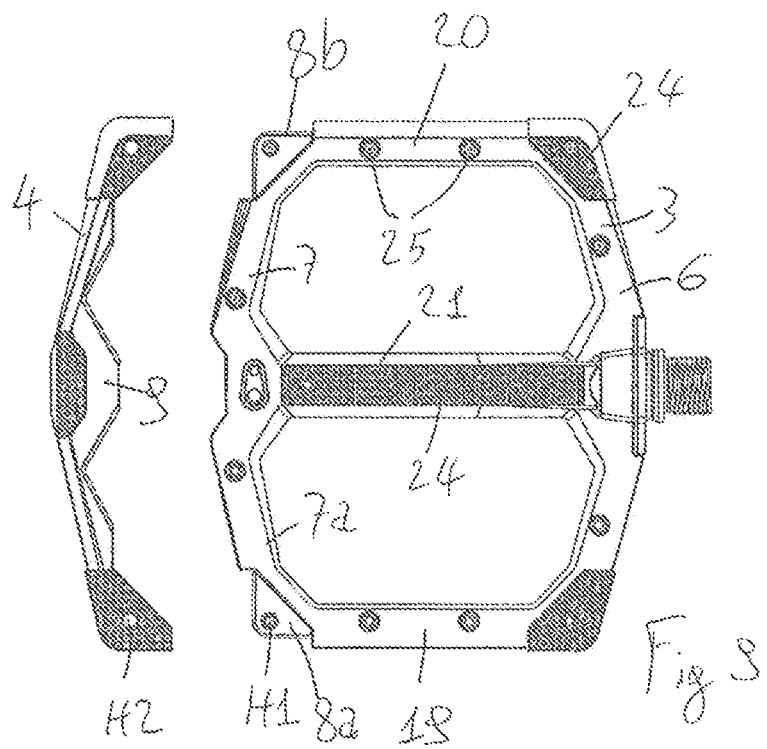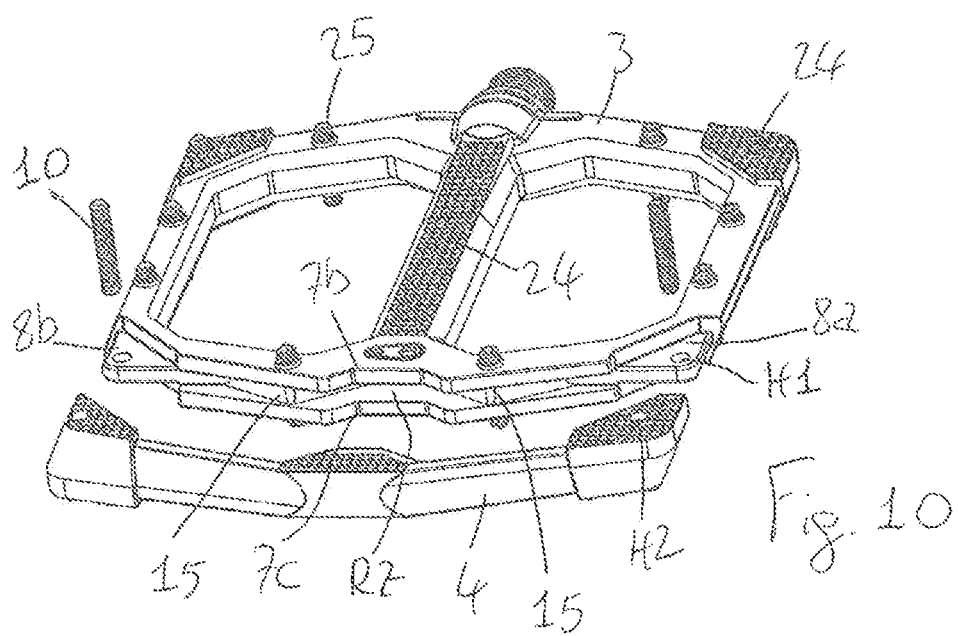

PEDAL FOR A BICYCLE AND BICYCLE INCLUDING THE SAME

TECHNICAL FIELD OF THE INVENTION

The present invention relates to a pedal for a bicycle and bicycle including the same.

STATE OF THE ART

Mountain bike pedals are typically either "flat" pedals for use with shoes that have rubber soles or "clipless" pedals that engage with a cleat on the shoe. Flat pedals typically comprise of a body and a spindle assembly. The body is usually made of a single component and made of either aluminum or plastic. Some bodies are made of more than one component either for styling reasons or cost reasons or in some cases to provide a body that provides improved impact protection on the (front) leading surface of the pedal while still being relatively light weight.

During mountain biking use, the outermost surface and outer corners of flat pedals often collide with rocks and other obstacles, sometimes causing damage. Nearly all of the damage to a flat pedal occurs to the outer surface or outer corners and not to the (front) leading surface. Damage on the outer corners or outer surface sometimes requires the entire pedal to be replaced, especially if there is damage to the outer corner traction pin supports. Outer corner traction pins are critical to providing shoe to pedal traction and yet these same outer corners often collide with obstacles and can result in traction pin support damage such that outer corner traction pins can no longer be used or lean at an unintentional direction.

SUMMARY OF THE INVENTION

It is therefore a principal object of the present invention to provide a new pedal for a bicycle.

Another object of the present invention is to provide a new pedal for a bicycle which ensures proper protection against impacts and abrasions.

Another object of the present invention is to provide a new pedal for a bicycle which is strong, but also suitably slippery when contacting rocks and other obstacles.

Another object of the present invention is to provide a new pedal for a bicycle which is simple to be obtained and installed.

Another object of the present invention is to provide a new pedal for a bicycle, which can be maintained quickly and effectively.

According to the present invention a pedal as described in the present application is provided.

According to the present invention a bicycle as described in the present application is provided.

The present application refers to preferred and advantageous embodiments of the invention.

BRIEF DESCRIPTION OF THE DRAWINGS

These and other advantages will be better understood by any man skilled in the art from the following description and from the attached drawings, given as a not-limiting example, in which:

FIG. 3 shows a spindle assembly for the pedal of FIG. 1;

FIG. 4 is an exploded view of the spindle assembly of FIG. 3;

FIG. 9 is a partially exploded top view of the pedal of FIG. 1; and

FIG. 10 is a partially exploded perspective view of the pedal of FIG. 1.

DETAILED DESCRIPTION

Figure 1:
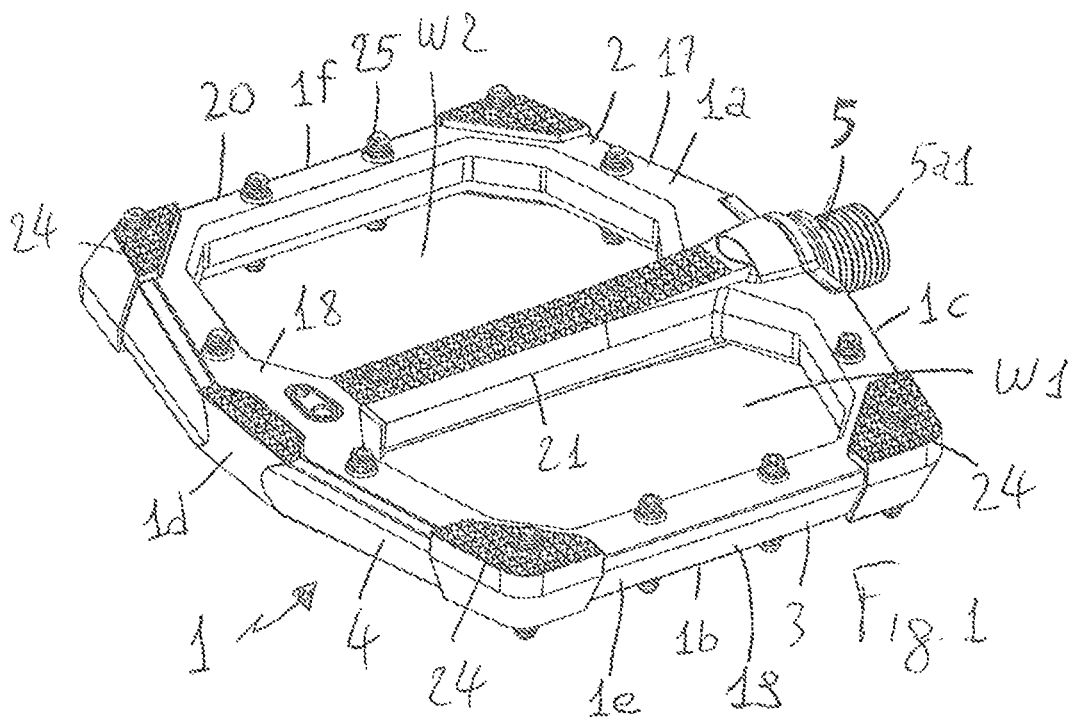
FIG. 1 is a perspective view of a pedal according to the present invention.
Figure 2:
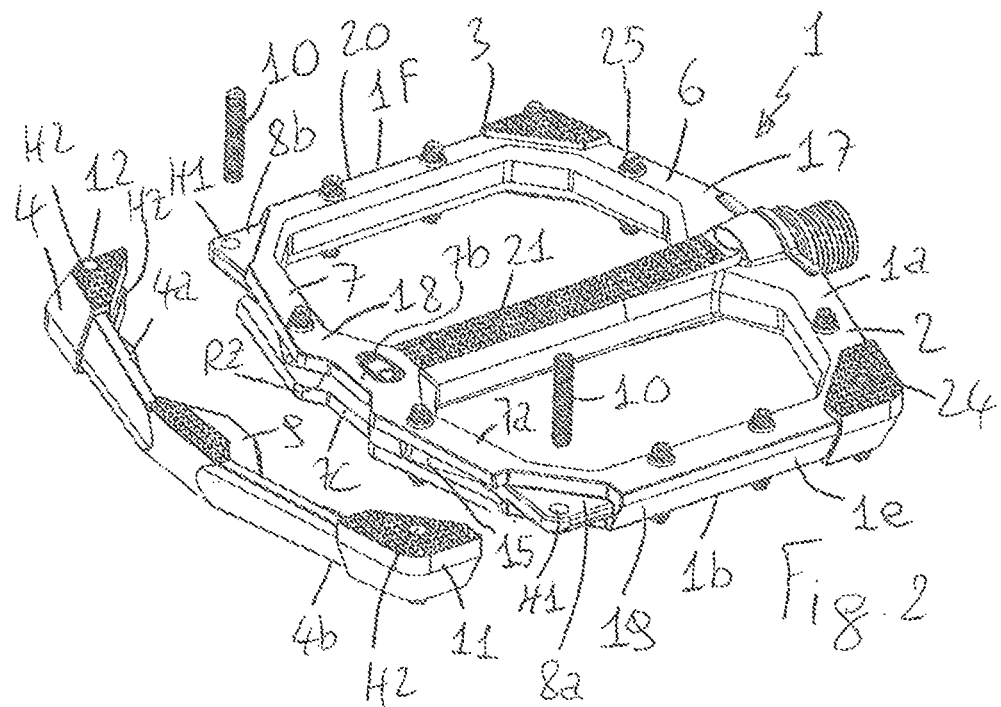
FIG. 2 is a partially exploded view of the pedal of FIG. 1.
Figure 5:
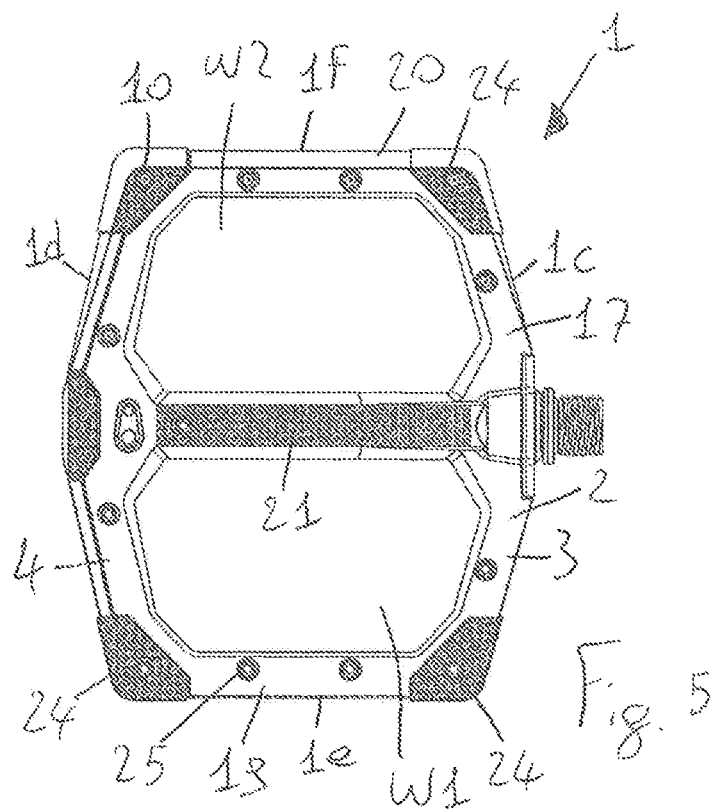
FIG. 5 is a top view of the pedal of FIG. 1.
Figure 6:
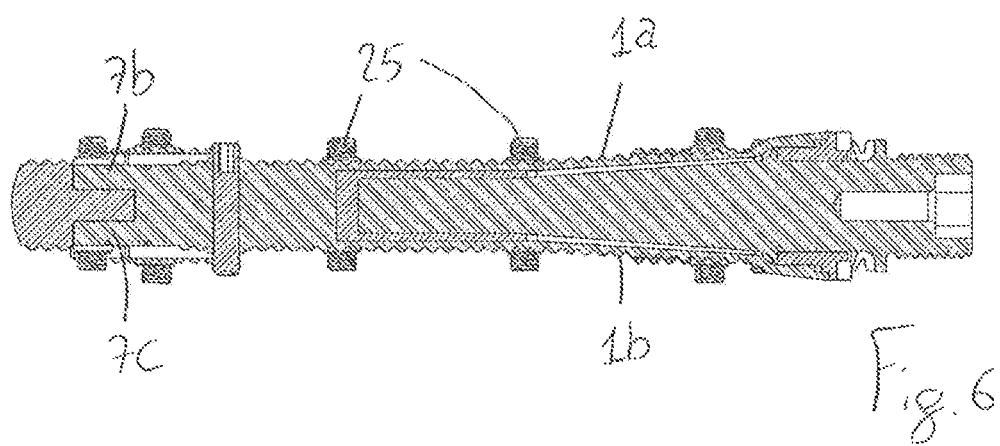
FIG. 6 is a cross-section view of the pedal of FIG. 1.
Figure 7:
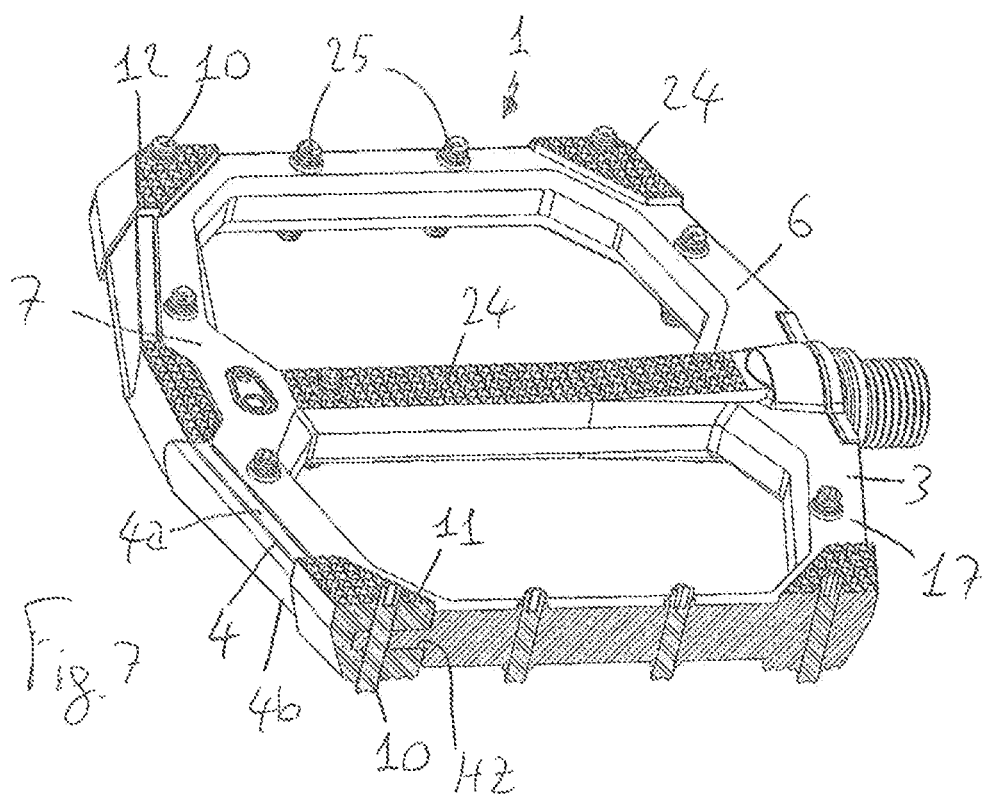
FIG. 7 is a view partially in cross-section of the pedal of FIG. 1.
Figure 8:
FIG. 8 is an end view of the pedal of FIG. 1.

The present invention relates to a pedal 1 for a bicycle, preferably a flat pedal, i.e. a bike pedal to be used with shoes without cleats, such as for example a mountain bike pedal for use with shoes that have rubber soles. Such pedal 1 has a body 2 comprising at least two components 3, 4, and a spindle assembly 5 for the connection of the pedal 1 to a respective crank arm of a bicycle (not shown in the drawings).

One of the components of the pedal 1 is a structural main component 3 including an inner part 6 designed to be, in use, proximal to a bicycle crank arm, and an outer part 7, whereas another component is a bash guard component 4 designed to constitute the outermost or outer pedal surface, i.e. the surface distal, in use, from a bicycle crank arm.

The bash guard component 4 is removably connected or secured or fastened (i.e. attached firmly or securely) to the outer part 7 of the structural main component 3.

The expression "removably connected or secured or fastened" means that the components 3, 4 can be connected and disconnected or rather fastened and unfastened from each other, for example by means of screws and/or bolts and/or pins and/or rivets and/or snap-fit and/or bayonet-fit and/or forced insertion or the like, without this (mainly the disconnection or unfasten step) involving damage to the components themselves (with specific reference to the main structural component 3) or breakage of the latter. Owing to such expedient, the bash guard component 4 can be replaced as soon as the same is broken or damaged or if the rider would like to mount or assemble another bash guard component 4.

Thus, the pedal 1 can comprises screws, bolts, rivets and/or pins, for example threaded or traction pins 10 for removably securing or connecting or fastening the structural main component 3 and the bash guard component 4 together or one with the other.

In addition or as an alternative, components 3, 4 can be removably connected to one another by means of snap-fit and/or bayonet-fit and/or forced insertion.

If provided, the screws, bolts and/pins 10 are preferably inserted or fitted along a direction of insertion or fitting which is substantially orthogonal to the main surfaces 1a, 1b of the pedal 1. In addition or as an alternative, the screws, bolts and/pins 10 are inserted or fitted along a direction of insertion or fitting which is substantially parallel or inclined (not orthogonal) to the main surfaces 1a, 1b of the pedal 1.

Preferably, the structural main component 3 is enbloc, i.e. made of a single piece.

Preferably, the bash guard component 4 is enbloc, i.e. made of a single piece.

Advantageously, the bash guard component 4 and the outer part 7 are complementary, i.e. they complement to each other.

In this respect, more advantageously, the structural main component 3, at the respective outer part 7, has at least one protruding portion 8*a*, 8*b* and delimits at least one recessed zone RZ, whereas the bash guard component 4 delimits at least one hollow zone HZ and comprises at least one protrusion 9. In this case, the bash guard component 4 is assembled with the outer part 7 of the structural main component 3 owing to the engagement or mutual insertion of the at least one protruding portion 8 into the at least one hollow zone HZ and of the at least one protrusion 9 into the at least one recessed zone RZ.

In such case, the removable connection or securement can be obtained owing to such engagement optionally supplemented by means of screws, bolts, rivets, pins or the like.

More advantageously, the bash guard component 4 constitutes a minor part of the body 2 of the pedal, for example among 10% to 30%, if desired among 20% and 25% of the volume of the body 2.

The pedal 1 can include two main surfaces 1*a*, 1*b* and edge surfaces 1*c*-1*e* comprising an inner surface 1*c* facing, in use, the bicycle crank arm, the outer surface 1*d* facing away, in use, a respective bicycle crank as well as two side (straight or curved or with irregular shape) surfaces 1*e*, 1*f*, whereas the bash guard component 4 defines the outer surface 1*d* as well as preferably or with reference to the not-limitative embodiment shown in the figures, at least one portion (even one or more small portions) of at least one main surface 1*a*, 1*b*. Of course, the bash guard component 4 defines substantially whole the outer surface 1*d*.

In such case, the bash guard component 4 advantageously defines the outer surface 1*d* as well as at least one portion (even a small portion) of each main surface 1*a*, 1*b*.

In this respect, the bash guard component 4 can for example define a portion of the main surface 1*a* and/or 1*b* extending from one side surface 1*e* to the other 1*f* side surface, although the extension of such portion could be for example higher at the respective (outer) corners of the pedal and a central zone and lower at the area among the latter.

As a matter of fact, the main surfaces 1*a*, 1*b* are those providing the main support surfaces for the footwear of a rider, although, in use, one main surface only is in contact with the footwear, whereas the other is clearly distal therefrom.

Advantageously, each of the main surfaces 1*a*, 1*b* lies substantially in a plane, although rising portions can be provided, for example at the corners, which rising portions protrudes from the plane of the respective main surfaces 1*a*, 1*b* for example about 1 mm-1 cm or 1 mm-5 mm.

Preferably, the outer part 7 plus the bash guard component 4 substantially corresponds in shape and size to the inner part 6, although they (3 and 4+7) are arranged symmetrical one 3 relatively to the other 4+7 with respect to a plane orthogonal to the main surface 1*a*, 1*b* and to the direction from the inner 1*c* to the outer 1*d* surface of the pedal 1, as well as passing through a midline of the body 2 of the pedal 1.

With reference to the not-limiting embodiment shown in the figures, from one side surface 1*e* to the other 1*f* side surface, the outer part 7 of the main structural component 3 includes a first end protruding portion 8*a*, a recessed zone RZ and then a second end protruding portion 8*b*, whereas the bash guard component 4 comprises a first end shell portion 11 designed, in a connected or fastened position, to house the first end protruding portion 8*a*, a protrusion 9 designed to be housed, in a connected or fastened position, in the recessed zone RZ and a second end shell portion 8*b* designed to house, in a connected or fastened position, the second end protruding portion 12. In such case, each end shell portion 11, 12 delimits a respective hollow zone HZ.

More particularly, the first end protruding portion 8*a* and/or the second end protruding portion 8*b* can have a thickness lower than the base or main portion 7*a* of the outer part 7 and a width tapered when moving away from such base or main portion 7*a*.

The first end shell portion 11 with the first end protruding portion 8*a* housed therein can constitute an outer corner of the pedal 1, whereas the second end shell portion 8*b* with the second end protruding portion 12 housed therein can constitute the other outer corner of the pedal 1.

Referring now to the recessed zone RZ, the same can for example extends at an intermediate portion only of the outer part 7 or can extend among the ends, for example provided with protruding portion 8*a*, 8*b*, of the outer part 7.

More particularly, the recessed zone RZ can extend substantially in an intermediate zone among the main surfaces 1*a*, 1*b* and thus it is not open at the same surfaces, but it is delimited among two wall sections 7*b*, 7*c* of the outer part 7.

The outer part 7 could also include one or more ribs 15 running inside the recessed zone RZ and designed to abut, in a connected or fastened position, with a respective element of the bash guard component 4, for example with the protrusion/s 9.

Advantageously, the main structural component 3 comprises a rib 15 with two or three tips or two or three ribs 15 delimiting among them depression/s or concave zone/s, whereas the bash guard component 4 comprises a protrusions 9 with two or three tips or two or three protrusions 9 delimiting among them depressions or concave zone, with the tips of the rib 15 or the ribs 15 housed, in a connected or fastened position, in the depression/s or concave zone/s delimited by the protrusion/s 9, and the tips of the protrusion 9 or the protrusions 9 housed, in a connected or fastened position, in the depression/s or concave zone/s of the ribs/s 15.

Thus, with reference to the not limitative embodiment shown in the figures, the area among the ends of the outer part 7 includes, from one main surface 1*a* to the other 1*b*, a first wall section 7*b*, a recessed zone RZ, optionally provided with rib/s 15, and another or second wall section 7*c*.

The bash guard component 4 could instead include, in a direction from one main surface 1*a* to the other main surface 1*b*, a first layer 4*a*, designed to abut, in a connected or fastened position, preferably for its whole extension, against the first wall section 7*b*, the area with the optional hollow zone/s HZ and protrusion/s 9 and a second layer 4*b* designed to abut, in a connected or fastened position, preferably for its whole extension, against the second wall section 7*c*.

With reference to such alternative, the layers 4*a*, 4*b* can include, from one side surface 1*e* to the other 1*f* side surface, two or more segments inclined with respect to each other and the same applies to the wall section 7*b*, 7*c*, in such a manner that, in a connected or fastened position, the layers 4*a*, 4*b* abut for substantially their entire length with the wall section 7*b*, 7*c*, respectively, and owing to the same abutment an improved connection is obtained.

Advantageously, the main structural component 3 delimits one or more first hole and/or slot H1, for example through, designed to be aligned, in a connected or fastened position, each with a respective second hole and/or slot H2, for example through, in the bash guard component 4, so that pins, screws or the like 10 can be inserted in the thus aligned holes/slots so as to ensure a firm connection or securement among main structural component 3 and bash guard component 4. In such case, with reference to the not limitative embodiment shown in the figures, the screws or pins 10 threads (if provided) fit closely to the inner diameter or holes H1 and H2 so that there is a tight and secure interconnection between main structural body 3 and bash guard component 4.

As already indicated, such holes or slots H1, H2 define a direction of insertion or fitting of the pins 10, screws, rivets or the like, which is preferably orthogonal to the main surfaces 1a, 1b.

With reference to the not limitative embodiment shown in the figures, at least one hole or slot H1, H2 can be provided at one or both the ends of the outer part 7 and bash guard component 4 for the alignment of one first hole or slot H1 with one second hole or slot H2 and insertion in thus aligned holes/slots of a respective screw, pin, rivet or the like 10.

More particularly, one through hole or two aligned through holes H2 are obtained in the first end shell portion 11, whereas one hole H1 is obtained in the first end protruding portion 8a, so that a respective screw, rivet or pin 10 can be inserted in such aligned holes H1, H2.

In addition or as an alternative, one through hole or two aligned through holes H2 are obtained in the second end shell portion 12, whereas one hole H1 is obtained in the second end protruding portion 8b, so that a respective screw, rivet or pin 10 can be inserted in such aligned holes H1, H2.

Preferably, the structural main component 3 and the bash guard component 4 are made of different materials, for example the structural main component 3 is made of aluminum and the bash guard is made of injection molded plastic.

With reference to such an aspect, the main structural component 3 must be strong in order to support the weight of a rider, withstand impacts with obstacles such as in a crash, and withstand high forces such as when a rider might land hard after jumping.

The bash guard component 4 instead must withstand high impact and abrasion but does not necessarily need to be overly structurally strong. Furthermore, such component is ideally slippery when sliding against rocks and other obstacles, and ideally be inexpensive to make so that replacement is not costly.

Therefore, aluminum or other strong material is preferred for the main structural component 3 for strength, but plastic, such as glass filled nylon is preferred for the bash guard component 4 for being more slippery when contacting rocks and other obstacles as well as impact resistant, inexpensive and recyclable material.

In other words, aluminum is stronger but plastic glances off of obstacles better. The ideal flat pedal would have a main structural component made of aluminum and an outer surface and outer corners that are made of plastic.

However, even if the main structural component 3 is made of a similar material to the bash guard component 4, such as glass filled nylon or the like, there are still advantages over prior art in that bash guard component 4 remains easily and inexpensively replaceable.

Of course, other material/s can be used to obtain the components 3, 4.

With reference to the specific and not limitative embodiment shown in the figure, the structural main component 3 comprises an inner section 17 defining said inner part 6, an outer section 18 defining said outer part 7, two side sections 19, 20 bridge connecting the inner section 17 and the outer section 18, and an intermediate section 21 extending from an intermediate or central portion of the inner section 17 and an intermediate or central portion of the outer section 18, with at least through windows W1, W2 being defined among such sections 17-21.

More particularly, a first window W1 can be delimited by a part of the inner section 17, a part of the outer section 18 and a side section 19, whereas a second window W2 can be delimited by the other part of the inner section 17, the other part of the outer section 18 and the other side section 20.

With reference to a plan view of the pedal 1, the width of the windows W1, W2 corresponds preferably to at least 50%, 60%, 70%, 80% or 90%, of the width of the pedal itself.

Advantageously, the bash guard component 4 completes the outer section 18. More advantageously, the volume or extension of the bash guard component 4 is among 40% to 60% of the volume or extension of the outer section 18.

Advantageously, as above indicated the inner section 17 is symmetrical with respect to the outer section 18 plus the bash guard component 4 with respect to a plane orthogonal to the main surface 1a, 1b and to the direction from the inner 1c to the outer 1d surface of the pedal 1, as well as passing through a midline of the body 2 of the pedal 1.

Advantageously, the side sections 19, 20 are arranged symmetrical one relatively to the other with respect to a plane orthogonal to the main surface 1a, 1b and to the direction from an edge surface 1c to the other 1e of the pedal as well as passing through a midline of the body 2 of the pedal 1.

So far as the spindle assembly 5 is concerned, the same can be for example fitted at the inner part 6 in the intermediate section 21 (if provided) and protrudes therefrom (in a direction of moving away from the outer part 7) for the connection of the pedal to a crank of a bicycle.

The spindle assembly 5 can include a spindle, bearings and/or bushings, and some means to secure the spindle assembly in the body 2 of the pedal 1 while allowing spindle rotation. In connection with the not limitative example shown in the figures, the spindle assembly 5 can include a spindle element 5a with an end of connection 5a1, for example threaded, to a crank arm and another end distal from the crank arm and fitted into the pedal 1.

Moreover, the spindle assembly 5 can include an outer bushing 5b mounted at a tip of the spindle element 5a defining the distal end, a plate 5c mounted at the end of connection and defining two or more holes for the insertion of screws 5d or the like for coupling the spindle assembly 5 to the pedal 1. Furthermore, the spindle assembly 5 can include an inner bushing 5e, for example made of two halves, as well as one or more seals 5f and any other suitable component.

The main surfaces 1a, 1b could also include one or more portions 24 made of corrugated or textured or traction surface, which is/are designed to provide better grip and prevent the foot of a rider from slipping off the pedal, especially in wet or slippery conditions.

In this respect, the portions 24 can be provided at the corners of the pedal 1, and, if provided, at the intermediate section 21.

The pedal 1 could also be provided with one or more grip or traction pins or studs 25, which are small protruding metal or plastic spikes aimed at providing improved traction, enhanced control, enhance pedaling efficiency, and safety.

The grip or traction pins or studs 25, if provided, can be fitted in the sections of the pedal body 2 or rather in through holes obtained in the main structural component 3 and/or in the bash guard component 4, but such pins or studs 25 are not aimed at connecting or fastening the components 3, 4.

Subject-matter of the present invention is also a bicycle having, among the other components, such as a frame, wheels, a chain, a seat post, a saddle mounted on the seatpost, brakes and so on, two cranksets with two pedals 1 connected each at one of the cranksets.

As it is known, the crankset consists of two crank arms, one extending to the right side of the bicycle, and the other extending to the left side, whereas the pedals have a threaded spindle on one end that matches the threading on the crank arms.

Referring now to steps for connecting or fastening the bash guard component 4 on or to a main structural component 3, it will suffice to install the bash guard component 4 onto the main structural component 3, for example engaging the protruding portion/s 8a, 8b in the at least one hollow zone HZ and the protrusion/s 9 in the at least one recessed zone RZ, and after that, if needed, screws, rivets, pins 10 or the like are fitted or screwed into the holes H1 in the main structural component 3 and into holes H2 in the bash guard component 4 in a simple and secure way.

So far as the steps of replacing a bash guard component 4 for example after damage, it would suffice to remove one, two or more traction pins 10 or the like (if provided) from the components 3, 4, for example from the outer corners thereof, replace the bash guard component 4, and, if needed reinstall one, two or more traction pins 10 or the like. If traction pins 10 or the like means were also damaged, even the same can be replaced during the process.

Owing to the present invention, a flat pedal with a body having two parts is obtained, namely a main pedal body and an outer piece that is primarily a bash guard, the latter being easily and economically replaceable.

Advantageously, one material is used for the main structural component 3 and another for the bash guard component 4 in order to take advantage of different material properties for different functions.

The fit between the bash guard and the main structural component provides significant support to the bash guard during impacts.

There have been many pedals with multi-piece body parts, but none that have an intentionally replaceable outer bash guard or any replaceable piece that runs along the outside and corners.

A simple way to secure the bash guard to the main body is by using the two outer corner traction pins. In this way, there are no extra fasteners beyond an ordinary flat pedal used, which is simpler, less costly, and lighter.

The invention claimed is:

1. A pedal for a bicycle having a body comprising at least two components, and a spindle assembly for the connection of the pedal to a crank arm of the bicycle, wherein one of said at least two components is a structural main component including an inner part designed to be, in use, proximal to the crank arm, and an outer part, another of said at least two components being a bash guard component designed to constitute an outermost pedal surface comprising a surface distal, in use, from the crank arm, said bash guard component being removably connected or secured or fastened to the outer part of the structural main component, wherein said pedal includes two main surfaces and edge surfaces comprising an inner surface facing, in use, the crank arm, an outer surface facing away from, in use, the crank arm as well as two side surfaces, wherein said bash guard component defines the outer surface, and wherein from one side surface to the other side surface, said outer part of said structural main component includes a first end protruding portion, a recessed zone and then a second end protruding portion, whereas the bash guard component comprises a first end shell portion designed to house said first end protruding portion, a protrusion designed to be housed in said recessed zone and a second end shell portion designed to house said second end protruding portion.

2. The pedal according to claim 1, comprising screws, bolts, rivets and/or pins for removably securing or connecting or fastening the structural main component and the bash guard component together or one with the other.

3. The pedal according to claim 2, wherein said screws, bolts, rivets and/or pins are inserted or fitted along a direction of insertion or fitting which is substantially orthogonal to main surfaces of the pedal.

4. The pedal according to claim 2, wherein the structural main component delimits one or more first hole and/or slot designed to be aligned, in a connected or fastened position, each with a respective second hole and/or slot in the bash guard component, so that screws, bolts, rivets and/or pins can be inserted in the thus aligned holes/slots so as to ensure a connection or securement among the structural main component and the bash guard component.

5. The pedal according to claim 1, wherein said structural main component is made of a single piece.

6. The pedal according to claim 1, wherein said bash guard component is made of a single piece.

7. The pedal according to claim 1, wherein said structural main component at the respective outer part has at least one protruding portion and delimits at least one recessed zone, whereas said bash guard component delimits at least one hollow zone and comprises at least one protrusion, said bash guard component being assembled to the outer part of the structural main component owing to the engagement or mutual insertion of said at least one protruding portion in said at least one hollow zone and of said at least one protrusion in said at least one recessed zone.

8. The pedal according to claim 1, wherein said outer part plus the bash guard component corresponds to the inner.

9. The pedal according to claim 1, wherein said bash guard component defines the outer surface as well as at least one portion of at least one of the two main surfaces or of each main surface.

10. The pedal according to claim 1, wherein said structural main component and said bash guard component are made of different materials.

11. The pedal according to the claim 10, wherein said structural main component is made of aluminum and/or said bash guard is made of plastic.

12. The pedal according to claim 1, wherein said structural main component comprises an inner section defining said inner part, an outer section defining said outer part, two side sections bridge connecting said inner part and said outer part, and an intermediate section extending from an intermediate or central portion of the inner part and an intermediate or central portion of the outer part, at least two through windows being defined among said inner section, said outer section, said two side sections and the intermediate section.

13. The pedal according to claim 12, wherein said spindle assembly is fitted at said inner part in said intermediate section and protrudes therefrom for the connection of the pedal to the crank arm of the bicycle.

14. A bicycle having two crank arms with two pedals according to claim 1 connected each at one of said crank arms.

* * * * *